(12) United States Patent
Wakatsuki

(10) Patent No.: US 11,272,115 B2
(45) Date of Patent: Mar. 8, 2022

(54) CONTROL APPARATUS FOR CONTROLLING MULTIPLE CAMERA, AND ASSOCIATED CONTROL METHOD

(71) Applicant: SONY CORPORATION, Tokyo (JP)

(72) Inventor: Masashi Wakatsuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/618,257

(22) PCT Filed: Apr. 19, 2018

(86) PCT No.: PCT/JP2018/016080
§ 371 (c)(1),
(2) Date: Nov. 29, 2019

(87) PCT Pub. No.: WO2018/225392
PCT Pub. Date: Dec. 13, 2018

(65) Prior Publication Data
US 2020/0154025 A1    May 14, 2020

(30) Foreign Application Priority Data
Jun. 9, 2017   (JP) .............................. JP2017-114472

(51) Int. Cl.
*H04N 5/235* (2006.01)
*H04N 5/232* (2006.01)
*H04N 5/247* (2006.01)

(52) U.S. Cl.
CPC ......... *H04N 5/2353* (2013.01); *H04N 5/2351* (2013.01); *H04N 5/23238* (2013.01); *H04N 5/247* (2013.01)

(58) Field of Classification Search
CPC ............. H04N 5/2353; H04N 5/23238; H04N 5/2351; H04N 5/247; H04N 5/2624; H04N 5/232
See application file for complete search history.

(56) References Cited

U.S. PATENT DOCUMENTS

| | | | |
|---|---|---|---|
| 5,903,303 A | 5/1999 | Fukushima et al. | |
| 2008/0303922 A1* | 12/2008 | Chaudhri | ............... H04N 5/235 348/231.99 |
| 2013/0176400 A1 | 7/2013 | Jang et al. | |

(Continued)

FOREIGN PATENT DOCUMENTS

| EP | 2 950 521 A2 | 12/2015 |
|---|---|---|
| JP | 3830689 B2 | 10/2006 |

(Continued)

OTHER PUBLICATIONS

International Search Report dated Jul. 18, 2018 in PCT/JP2018/016080 filed on Apr. 19, 2018.

*Primary Examiner* — Gevell V Selby
(74) *Attorney, Agent, or Firm* — Oblon, McClelland, Maier & Neustadt, L.L.P.

(57) ABSTRACT

A multi-camera control apparatus identifies an adjusted camera setting for a first image pickup apparatus to achieve a uniform brightness in a stitched portion of a composite image, the composite image including at least a portion of an image captured by the first image pickup apparatus and at least a portion of an image captured by a second image pickup apparatus.

20 Claims, 7 Drawing Sheets

(56) References Cited

U.S. PATENT DOCUMENTS

| | | | |
|---|---|---|---|
| 2014/0327774 A1* | 11/2014 | Lu | H04N 5/23238 348/148 |
| 2014/0375759 A1* | 12/2014 | Mikes | H04N 5/23238 348/36 |
| 2015/0035051 A1 | 12/2015 | Han | |
| 2017/0295324 A1* | 10/2017 | Cabral | H04N 5/23238 |
| 2018/0191956 A1* | 7/2018 | Nomura | H04N 5/238 |
| 2018/0375759 A1* | 12/2018 | Shan | H04L 45/38 |

FOREIGN PATENT DOCUMENTS

| | | |
|---|---|---|
| JP | 2010074535 A | 4/2010 |
| JP | 2015-050498 | 3/2015 |
| JP | 2015-095853 | 5/2015 |
| JP | 2016208306 A | 12/2016 |
| WO | WO 2006/022630 A1 | 3/2006 |

* cited by examiner

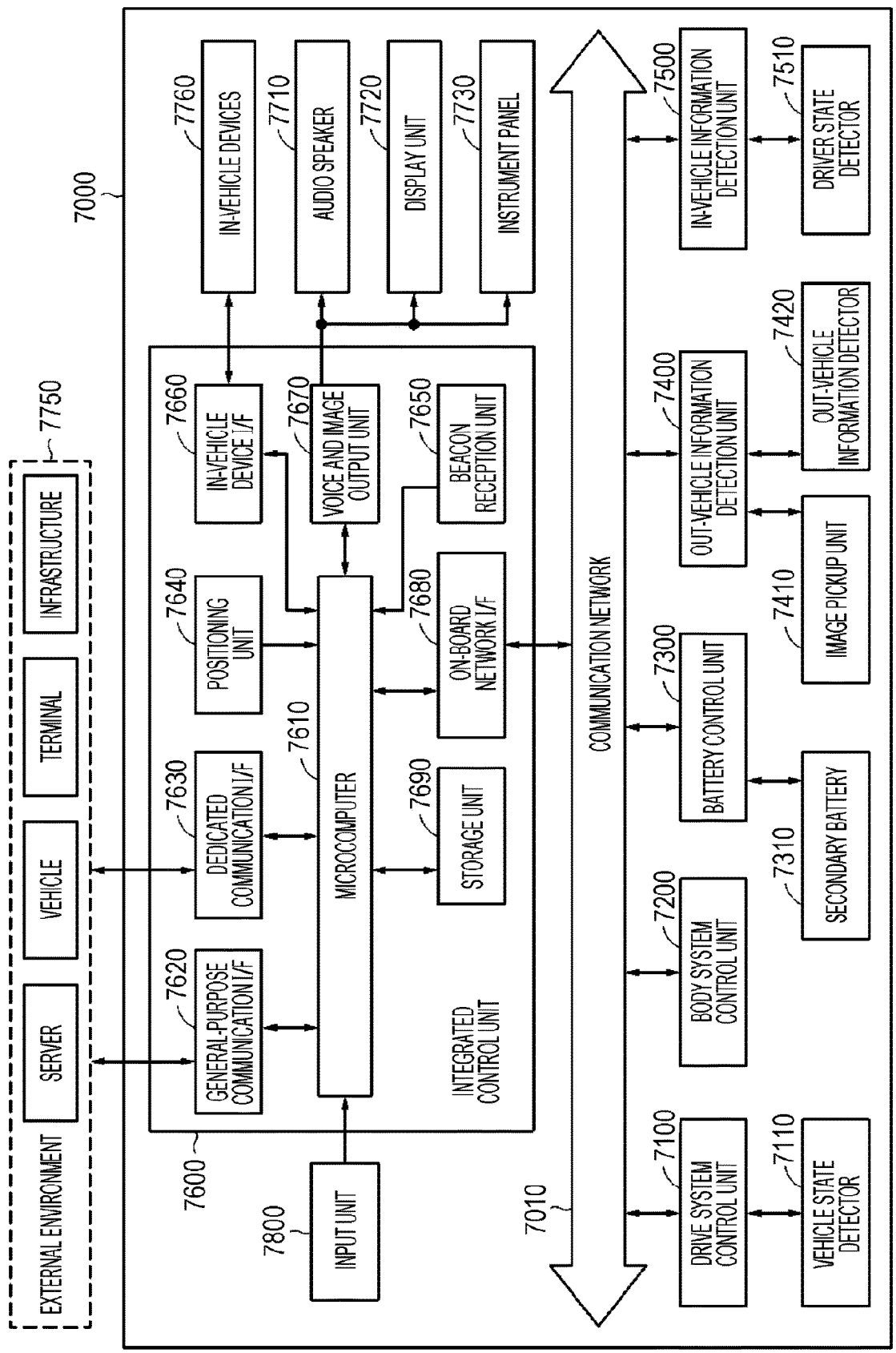

CONTROL APPARATUS FOR CONTROLLING MULTIPLE CAMERA, AND ASSOCIATED CONTROL METHOD

CROSS REFERENCE TO RELATED APPLICATIONS

This application claims the benefit of Japanese Priority Patent Application JP 2017-114472 filed on Jun. 9, 2017, the entire contents of which are incorporated herein by reference.

TECHNICAL FIELD

The present disclosure relates to a control apparatus, an image pickup apparatus, a control method, a program, and an image pickup system.

BACKGROUND ART

A system including a plurality of image pickup apparatuses (multiple cameras), has been proposed in related art (e.g., refer to PTL 1).

CITATION LIST

Patent Literature

PTL 1: JP 3830689 B2

SUMMARY

Technical Problem

In the field, it is desirable that each image pickup apparatus is appropriately set.

The present disclosure is at least to provide a control apparatus capable of performing appropriate setting to each of a plurality of image pickup apparatuses, an image pickup apparatus, a control method, a program, and an image pickup system.

Solution to Problem

A multi-camera control apparatus includes circuitry configured to
receive respective camera settings from at least a first image pickup apparatus and a second image pickup apparatus;
identify an adjusted camera setting for the first image pickup apparatus to achieve a uniform brightness in a stitched portion of a composite image, the composite image including at least a portion of an image captured by the first image pickup apparatus and at least a portion of an image captured by the second image pickup apparatus; and
send the adjusted camera setting to the first image pickup apparatus so the first image pickup apparatus will apply the adjusted camera setting when performing an image capture operation.

A multi-camera control method including:
receiving respective camera settings from at least a first image pickup apparatus and a second image pickup apparatus;
identifying with circuitry an adjusted camera setting for the first image pickup apparatus to achieve a uniform brightness in a stitched portion of a composite image, the composite image including at least a portion of an image captured by the first image pickup apparatus and at least a portion of an image captured by the second image pickup apparatus; and
distributing the adjusted camera setting to the first image pickup apparatus so the first image pickup apparatus applies the adjusted camera setting when performing an image capture operation.

A multi-camera control system including:
a first image pickup apparatus;
a second image pickup apparatus; and
a controller having circuitry configured to
receive respective camera settings from at least the first image pickup apparatus and the second image pickup apparatus,
identify an adjusted camera setting for the first image pickup apparatus to achieve a uniform brightness in a stitched portion of a composite image, the composite image including at least a portion of an image captured by the first image pickup apparatus and at least a portion of an image captured by the second image pickup apparatus, and
send the adjusted camera setting to the first image pickup apparatus, wherein the first image pickup apparatus applies the adjusted camera setting when performing an image capture operation.

The apparatus, method and system described above used to control a vehicle.

The apparatus, method and system described above used to provide a composite panoramic image and/or virtual (or augmented) reality image.

Advantageous Effects of Invention

At least according to the embodiments of the present disclosure, for example, the appropriate setting can be performed to each of the plurality of image pickup apparatuses. Note that, the effects described here are not necessarily limited, and any of the effects described in the present disclosure may be provided. In addition, the contents of the present disclosure should not be interpreted, being limited to the exemplified effects.

BRIEF DESCRIPTION OF DRAWINGS

FIG. 6 is a block diagram of an exemplary schematic configuration of a vehicle control system.

DESCRIPTION OF EMBODIMENTS

An embodiment, a modification, and an application according to the present disclosure will be described below with reference to the drawings. Note that the descriptions will be given in the following order.

<1. Embodiment>
<2. Modification>
<3. Application>

The embodiment, the modification, and the application to be described below are preferred specific examples according to the present disclosure, and the contents of the present disclosure are not limited to the embodiment, the modification, and the application.

1. Embodiment

{Exemplary Configuration of Image Pickup System}

Figure 1:
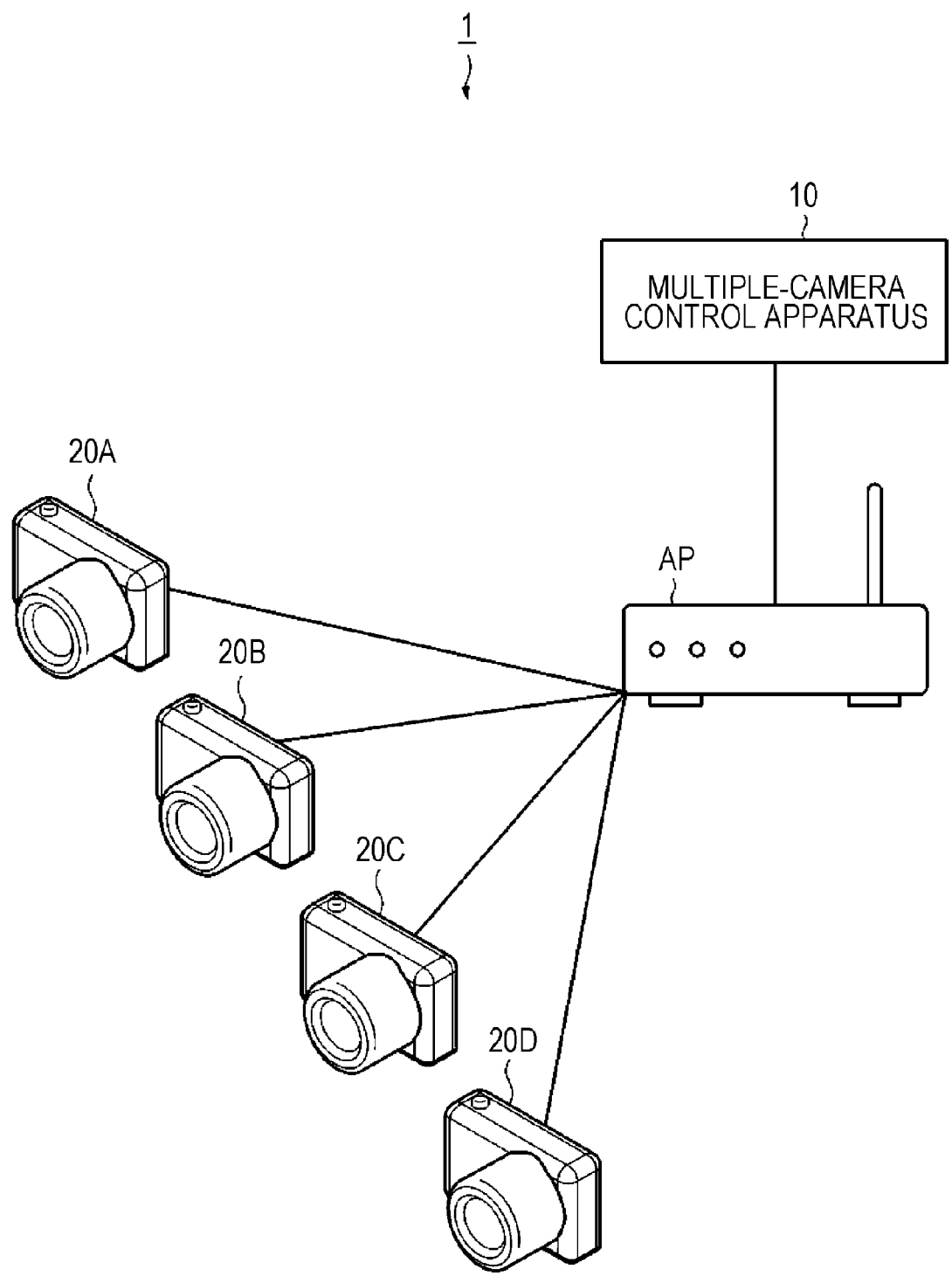
FIG. 1 is a diagram of an exemplary configuration of an image pickup system according to one embodiment of the present disclosure.

FIG. 1 illustrates an exemplary configuration of an image pickup system (an image pickup system 1) according to one embodiment of the present disclosure. The image pickup system 1 includes a plurality of image pickup apparatuses and a multiple-camera control apparatus 10 as a control apparatus. The image pickup system 1 according to the present embodiment includes four image pickup apparatuses 20A, 20B, 20C, and 20D as the plurality of image pickup apparatuses (hereinafter, also referred to as image pickup apparatuses 20 in a case where there is no need to distinguish the individual image pickup apparatuses). Needless to say, the number of image pickup apparatuses 20 is not limited to four, and thus may be at least two.

Close-range radio communication is performed through an access point AP between the multiple-camera control apparatus 10 and the image pickup apparatuses 20. The standard of the radio communication can adopt, for example, WiFi (registered trademark), but is not limited to this. Note that, wired communication may be performed in connection through wires between the multiple-camera control apparatus 10 and the image pickup apparatuses 20.

The multiple-camera control apparatus 10 determines set values for the image pickup apparatuses 20A, 20B, 20C, and 20D. For example, a personal computer, a tablet computer, or a smartphone can be applied to the multiple-camera control apparatus 10. The multiple-camera control apparatus 10 functions as a master in the image pickup system 1. In addition, the multiple-camera control apparatus 10 according to the present embodiment, has a function of stitching images shot by the image pickup apparatuses 20 together to generate a panoramic image or virtual reality (VR).

The four image pickup apparatuses 20A to 20D are, for example, arranged at close range. The arrangement aspect of the image pickup apparatuses 20 can be arbitrary. For example, as illustrated in FIG. 1, the four image pickup apparatuses 20 are laterally (horizontally) arranged each other. The four image pickup apparatuses 20 may be longitudinally (vertically) arranged each other or may be laterally and longitudinally arranged. The four image pickup apparatuses 20 may be circumferentially arranged. In this case, the image pickup directions of the image pickup apparatuses 20 may be inside or outside the circle. For example, the image pickup apparatuses 20 each are arranged at a predetermined position, being supported by a supporting device referred to as a rig. Each image pickup apparatus 20 may be supported by hand by a user. The image pickup apparatuses 20 each may include an apparatus mainly having an image pickup function, such as a single-lens reflex camera, or may include an apparatus having multiple functions, such as a smartphone or a tablet computer, the multiple function including an image pickup function.

Processing performed in the image pickup system 1, will be schematically described. The multiple-camera control apparatus 10 transmits the set values for achieving adequate exposure, to each of the image pickup apparatuses 20A to 20D in the image pickup system 1. Furthermore, the multiple-camera control apparatus 10 transmits timing information for performing shooting, to each of the image pickup apparatuses 20A to 20D. The image pickup apparatuses 20A to 20D each set the set values transmitted to itself, to the corresponding functional blocks. Then, the image pickup apparatuses 20A to 20D synchronously shoot at a timing indicated with the timing information, to shoot a predetermined subject.

Pieces of image data acquired by the shooting operations of the image pickup apparatuses 20A to 20D, is transmitted to the multiple-camera control apparatus 10. The multiple-camera control apparatus 10 stitches the pieces of image data supplied from the image pickup apparatuses 20A to 20D together, to generate a panoramic image or a VR image. The multiple-camera control apparatus 10 stitches the pieces of image data supplied from the image pickup apparatuses 20A to 20D together, in an appropriate direction, such as laterally, longitudinally, or circumferentially. As a specific applied example of the image pickup system 1, the image pickup apparatuses 20A to 20D are possessed by, for example, different owners. That is, the image pickup system 1 includes image pickup apparatuses 20 possessed by participants in a party, for example, so that a panoramic image or a VR image can be easily acquired.

Note that, the panoramic image and the VR image each may be a still image or a moving image. For the moving image, the synchronous shooting is performed a predetermined number of times, and images acquired by the synchronous shooting are stitched together. Then, for example, a user specifies a reproduced portion in the images that have been stitched together and starts reproduction, so that moving image reproduction can be performed. That is, the technology according to the present disclosure can be applied to each of the still image and the moving image.

Here, aperture, shutter speed, and sensitivity (gain) (all camera settings, or set values) have been known as factors (parameters) for determining the brightness of an image acquired by an image pickup apparatus. The aperture has a range in focus (a depth of field) varying depending on a set value, and the shutter speed has a degree of blur of a subject, varying depending on a set value. For example, when the shutter speed is slow, a moving subject is captured as a flow. Thus, it is difficult to correct, for the two factors, an image that has already been shot, by image processing. Therefore, in a case where the respective images acquired by the image pickup apparatuses 20 are stitched together, the set value (a first set value) of at least one of the aperture and the shutter speed (both of the two according to the present embodiment), is desirably uniform between the image pickup apparatuses 20.

Meanwhile, adjustment of the sensitivity can be easily achieved by the image processing. In a case where the set values of the aperture and the shutter speed are uniform between the image pickup apparatuses 20, overexposure or underexposure occurs depending on the positions of the image pickup apparatuses 20. Thus, according to the present embodiment, the set value (a second set value) of the sensitivity is set varying for each of the image pickup apparatuses 20A to 20D. With this arrangement, the exposure of each image to be stitched together becomes appropriate, so that a high-quality panoramic image or VR image can be generated.

Note that, for the set value of the sensitivity varying for each of the image pickup apparatuses 20A to 20D, the set value of the sensitivity for each of the image pickup apparatuses 20A to 20D is not necessarily different from that for one another, and thus the set value of the sensitivity may remain the same between at least two of the image pickup apparatuses 20. For example, the set value of the sensitivity may remain the same between the image pickup apparatuses 20A and 20B, and the set value of the sensitivity for each of the image pickup apparatuses 20C and 20D may be different from the set value of the sensitivity for each of the image pickup apparatuses 20A and 20B. In addition, the set value of the sensitivity is at least calculated for each of the image pickup apparatuses 20A to 20D, and the set value of the sensitivity may become the same between the image pickup apparatuses 20A to 20D, depending on a shooting environment. The one embodiment according to the present disclosure that has been made in consideration of the points, will be described in more detail below.

{Exemplary Configuration of Multiple-Camera Control Apparatus}

Figure 2:
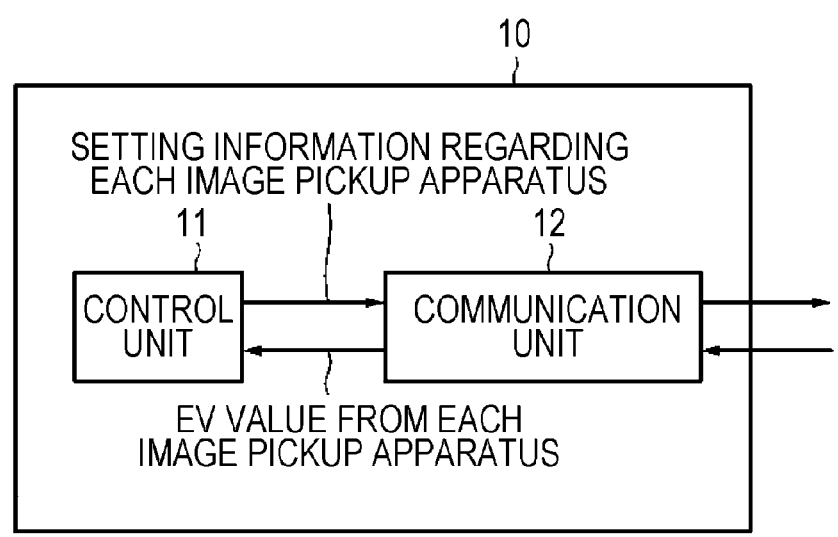
FIG. 2 is a block diagram of an exemplary configuration of a multiple-camera control apparatus according to the one embodiment of the present disclosure.

FIG. 2 illustrates an exemplary configuration of the multiple-camera control apparatus 10. For example, the multiple-camera control apparatus 10 includes a control unit 11 and a communication unit 12.

The control unit 11 includes a central processing unit (CPU) and the like, and controls each unit of the multiple-camera control apparatus 10. The control unit 11 performs processing based on data acquired through the communication unit 12, and generates data to be transmitted to the image pickup apparatuses 20 through the communication unit 12.

The communication unit 12 is provided in order to communicate with the image pickup apparatuses 20. According to the present embodiment, the communication unit 12 functions as an acquisition unit. The communication unit 12 acquires data transmitted from the image pickup apparatuses 20 (e.g., an exposure value (EV) being an exemplary total exposure amount to be described later) in communication and supplies the data that has been acquired, to the control unit 11. In addition, the communication unit 12 operates in response to the control of the control unit 11, and transmits the data supplied from the control unit 11 (e.g., setting information for each image pickup apparatus 20), to the image pickup apparatuses 20.

Note that, FIG. 2 illustrates only a main configuration relating to the present embodiment, from the configuration of the multiple-camera control apparatus 10. The multiple-camera control apparatus 10 may have a configuration in addition to the illustrated configuration. For example, the multiple-camera control apparatus 10 may include an operating input unit, such as a touch panel or a keyboard, a speaker, and a display.

{Exemplary Configuration of Image Pickup Apparatus}

Next, the configurations of the image pickup apparatuses 20 will be described. Note that, the configuration of the image pickup apparatus 20A will be exemplarily described in the following description. If the image pickup apparatuses 20B to 20D each have a configuration for performing an operation to be described later, the configurations may be the same as or different from the configuration of the image pickup apparatus 20A.

Figure 3:
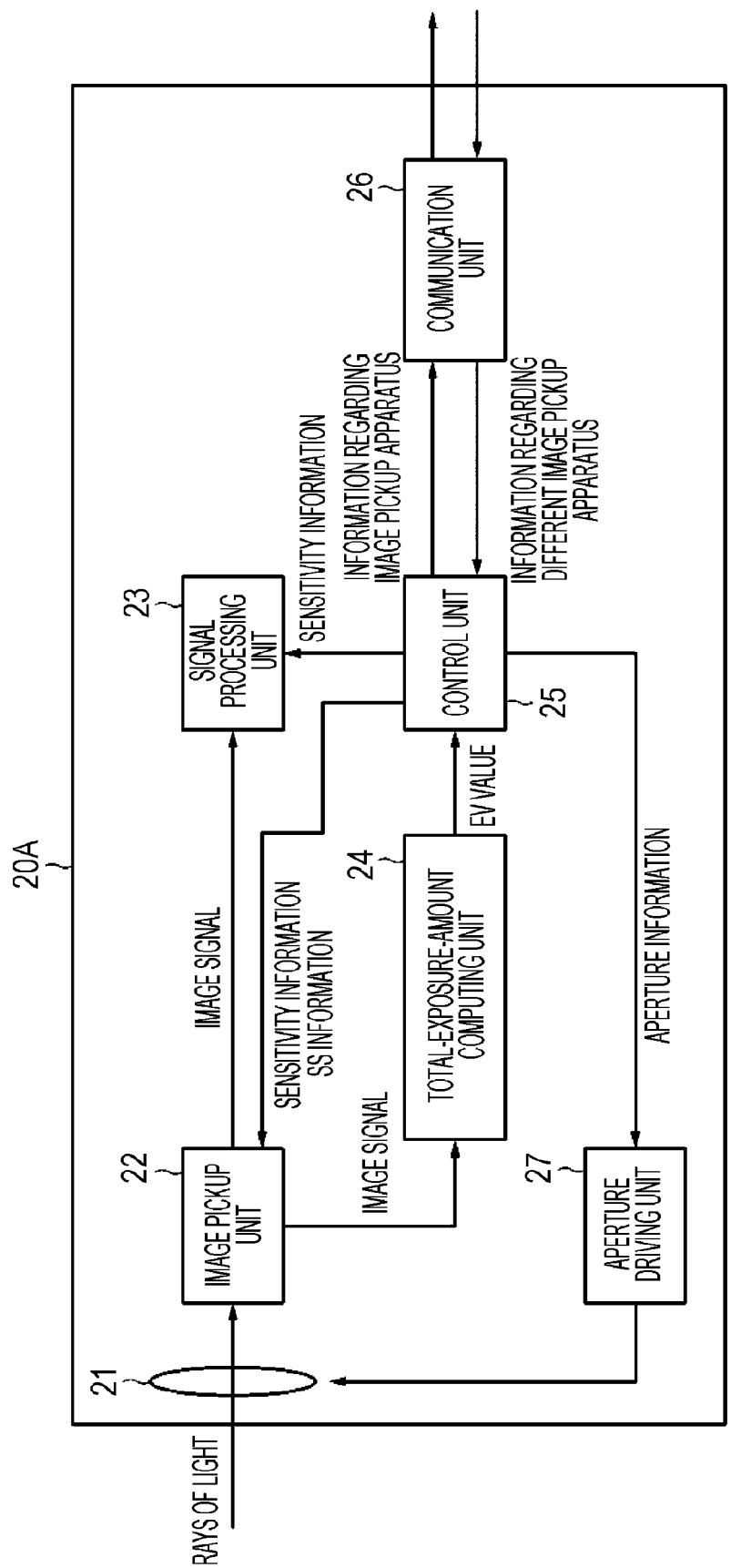
FIG. 3 is a block diagram of an exemplary configuration of an image pickup apparatus according to the one embodiment of the present disclosure.

FIG. 3 illustrates an exemplary configuration of the image pickup apparatus 20A circuitry according to the one embodiment. For example, the image pickup apparatus 20A includes an optical image pickup system 21, an image pickup unit 22, a signal processing unit 23, a total-exposure-amount computing unit 24, a control unit (an image pickup control unit) 25, a communication unit 26, and an aperture driving unit 27.

For example, a shooting lens for concentrating light from a subject into the image pickup unit 22 and an aperture for adjusting the amount of the light, are collectively referred to as the optical image pickup system 21. FIG. 3 illustrates one shooting lens for convenience, but the shooting lens includes a focus lens, a zoom lens, and the like. A lens driving mechanism not illustrated, such as a motor, operates in response to a lens driving signal supplied from the control unit 25, so that the shooting lens moves along the optical axis. With this arrangement, an auto focus (AF) operation is achieved. The optical image of the subject acquired through the optical image pickup system 21, is formed on the image pickup unit 22 as an image pickup device. Note that the shooting lens may be integrally formed with the body of the image pickup apparatus 20A, or may be attachable to and detachable from the body through a predetermined adaptor.

The image pickup unit 22 includes an image pickup element for shot-image generation, and an analog front end (a preprocessing circuit). For example, a charge coupled device (CCD) or a complementary metal oxide semiconductor (CMOS) is used as the image pickup element. The image pickup unit 22 photoelectrically converts the light of the subject incident through the optical image pickup system 21, into the amount of electric charge, to generate an image. The preprocessing circuit performs, for example, sample and hold to an image pickup signal output from the image pickup element, in order to retain a signal/noise (S/N) ratio favorable with correlated double sampling (CDS) processing. Furthermore, gain is controlled with auto gain control (AGC) processing and analog/digital (A/D) conversion is performed, so that an image signal is output in a digital format. The image signal that has been output, is supplied to the signal processing unit 23 and the total-exposure-amount computing unit 24.

The signal processing unit 23 performs signal processing, such as white balance adjustment processing, color correction processing, gamma correction processing, Y/C conversion processing, or auto exposure (AE) processing, to the image signal supplied from the image pickup unit 22. In addition, the signal processing unit 23 adjusts the sensitivity of the image with the set value indicated with sensitivity information supplied from the control unit 25. For example, the set value relating to the sensitivity is referred to as international organization for standardization (ISO) sensitivity.

The total-exposure-amount computing unit 24 calculates an adequate (appropriate) exposure amount with the image signal supplied from the image pickup unit 22, and outputs the total exposure amount as a calculated result to the control unit 25. According to the present embodiment, the EV value is used as an exemplary total exposure amount.

For example, the control unit 25 includes a CPU, a random access memory (RAM), and a read only memory (ROM). For example, the ROM stores a program to be read and executed by the CPU. The RAM is used as a work memory for the CPU. The CPU performs various types of processing in accordance with the program stored in the ROM and issues a command, to control the entire image pickup apparatus 20A. The control unit 25 includes a real time clock (RTC) inside, and allows the image pickup apparatus 20A to operate to shoot at a timing (a time) indicated with the timing information to be described later. Note that, the details of specific processing performed by the control unit 25 will be given later.

The communication unit 26 is provided in order for the image pickup apparatus 20A to communicate with a different device (e.g., the multiple-camera control apparatus 10). The communication unit 26 transmits data supplied by the control unit 25, to the multiple-camera control apparatus 10 in communication on the basis of a predetermined communication scheme. In addition, the communication unit 26 receives data transmitted from the multiple-camera control apparatus 10 and supplied the data that has been received, to the control unit 25.

The aperture driving unit 27 drives an aperture driving mechanism not illustrated to operate the aperture, in response to a control signal (aperture information) supplied from the control unit 25.

Note that the configuration of the image pickup apparatus 20A described above can be appropriately changed. For example, the image pickup unit 22 may be one chip including the image pickup element and the preprocessing circuit layered. In addition, the image pickup apparatus 20A may include a storage unit that stores an image signal output from the signal processing unit 23. The storage unit may be built in the image pickup apparatus 20A or may be attachable to and detachable from the image pickup apparatus 20A. In addition, the image pickup apparatus 20A may include a display. For example, a liquid crystal display (LCD) or organic electro luminescence (EL) display can be used for the display. For example, an image (a through image) for determining an object to be shot, an image shot by the image pickup apparatus 20A, an image stored in the image pickup apparatus 20A, an image acquired from a different device through the communication unit 26, or an image acquired through a network is displayed on the display. Besides, for example, the image pickup apparatus 20A may include an operating input unit for operating the image pickup apparatus 20A.

(Flow of Signal in Image Pickup Apparatus)

Next, an exemplary flow of the signal in the image pickup apparatus 20A, will be described. The image signal acquired by the image pickup unit 22 is supplied to the signal processing unit 23 and the total-exposure-amount computing unit 24. The EV value calculated by the total-exposure-amount computing unit 24 is supplied to the control unit 25. Information including the EV value, the ID of the image pickup apparatus 20A, and the like, is transmitted as information regarding the image pickup apparatus 20A, from the communication unit 26 to the multiple-camera control apparatus 10.

In addition, the communication unit 26 receives the set values transmitted from the multiple-camera control apparatus 10. The control unit 25 controls the shutter speed (SS), the aperture, and the sensitivity on the basis of the set values. Specifically, the irradiation time of the light applied to the image pickup element of the image pickup unit 22, is controlled on the basis of the value relating to the shutter speed. In addition, the control unit 25 outputs the aperture information based on the set value relating to the aperture, to the aperture driving unit 27, and the aperture driving unit 27 controls the aperture in the optical image pickup system 21 in response to the aperture information. In addition, the control unit 25 outputs the sensitivity information to control the sensitivity, on the basis of the set value of the sensitivity transmitted from the multiple-camera control apparatus 10. For example, the control unit 25 outputs the sensitivity information to the image pickup unit 22 and then the gain to the signal output from the image pickup element is set to the value based on the sensitivity information, so that the sensitivity is adjusted. Note that, the control unit 25 may output the sensitivity information to the signal processing unit 23. Then, setting the gain in gain adjustment processing of the signal processing unit 23, to the value based on the sensitivity information may allow the sensitivity to be adjusted.

{Exemplary Operation}

Next, processing performed by each apparatus (the operation of each apparatus) included in the image pickup system 1, will be described with reference to a flowchart illustrated in FIG. 4. Note that, before the processing illustrated in FIG. 4, processing of constructing a network according to the image pickup system 1, is performed. The processing will be schematically described. First, the multiple-camera control apparatus 10 recognizes the image pickup apparatuses 20 included in the image pickup system 1. For example, the multiple-camera control apparatus 10 may transmit a beacon to the periphery and determine whether a response to the beacon is present, to recognize the peripheral image pickup apparatuses 20, or may recognize the image pickup apparatuses 20 connected in communication established with physical connection, in wired communication.

When the multiple-camera control apparatus 10 recognizes the image pickup apparatuses 20A to 20D as the image pickup apparatuses included in the image pickup system 1, the control unit 11 of the multiple-camera control apparatus 10 assigns different identifiers (IDs) to the image pickup apparatuses 20A to 20D. Internet protocol (IP) addresses may be used for the IDs. The control unit 11 controls the communication unit 12 to transmit the IDs to the corresponding image pickup apparatuses 20. For example, after received by the communication unit 26 of the image pickup apparatus 20A, the ID is supplied to the control unit 25. The control unit 25 recognizes the ID assigned to the image pickup apparatus 20A. Similar processing is performed in the other image pickup apparatuses 20B to 20D. Note that, the image pickup apparatus 20A will be exemplarily described below from the four image pickup apparatuses 20. Unless otherwise specified, the image pickup apparatuses 20B to 20D each perform processing similar to the processing performed by the image pickup apparatus 20A.

The processing illustrated with the flowchart of FIG. 4, will be described. At step ST11, the image signal is acquired through the image pickup unit 22 of the image pickup apparatus 20A. Subsequently, the processing proceeds to step ST12.

At step ST12, the total-exposure-amount computing unit 24 calculates the EV value indicating an adequate exposure value, with the image signal acquired with the processing at step ST11. Then, the processing proceeds to step ST13.

At step ST13, it is determined whether the apparatus is selected to serve as the master. The processing performed in the multiple-camera control apparatus 10 being the master and the processing performed in each of the image pickup apparatuses 20 are different from each other, and thus the determination processing according to the present embodiment allows the interpretation to be simplified. Note that, any of the image pickup apparatuses 20 may operate as the master. In that case, the processing is performed in the image pickup apparatus 20. In case where an apparatus is not identified as the master, namely, in a case where the role of the master is not assigned to any of the image pickup apparatuses 20A to 20D, the processing proceeds to step ST14.

At step ST14, the image pickup apparatus 20A transmits the total exposure amount computed by the total-exposure-amount computing unit 24 at step ST12, to the multiple-camera control apparatus 10. For example, the total-exposure-amount computing unit 24 supplies the EV value to the control unit 25. After converting the EV value into a signal in a format corresponding to the communication scheme, the control unit 25 controls the communication unit 26 to transmit the converted EV value to the multiple-camera control apparatus 10. Then, the processing proceeds to step ST15.

At step ST15, the communication unit 26 of the image pickup apparatus 20A receives the set values and the timing information transmitted from the multiple-camera control apparatus 10. Here, the timing information indicates the timing at which the shooting with the set values reflected is performed. Then, the processing proceeds to step ST16.

For the master, the processing at step ST16 is performed subsequently to step ST13. At step ST16, it is determined whether the communication unit 12 has received the EV values transmitted from all the image pickup apparatuses 20A to 20D. In a case where the respective EV values have not been received from the image pickup apparatuses 20A to 20D, the processing goes back to step ST16 and then the processing at step ST16 is repeated. Note that, in a case where a specific image pickup apparatus 20 has not transmitted the EV value during a predetermined time, control may be made to perform processing of requesting the EV value to the image pickup apparatus 20 or to perform the subsequent processing with the image pickup apparatus 20 skipped. At step ST16, in a case where the communication unit 12 have received the EV values transmitted from all the image pickup apparatuses 20A to 20D, the processing proceeds to step ST17.

At step ST17, the control unit 11 of the multiple-camera control apparatus 10 receives the EV values of all the image pickup apparatuses 20. Then, the processing proceeds to step ST18.

At step ST18, the control unit 11 of the multiple-camera control apparatus 10 calculates the set values relating to the shutter speed and the aperture, the set values being uniform between all the image pickup apparatuses 20. In addition, the control unit 11 of the multiple-camera control apparatus 10 calculates the set value of the sensitivity, varying depending on each of the image pickup apparatuses 20.

For example, the control unit 11 calculates each set value with the following method. A criterial EV value (a criterial total exposure amount) as a criterion, is determined from the four EV values transmitted from the image pickup apparatuses 20. For example, the control unit 11 determines the largest EV value (bright as the brightness of the image) as the criterial EV value. Note that, according to the present embodiment, the criterial EV value that has been transmitted from the image pickup apparatus 20A, will be described.

The control unit 11 sets sensitivity corresponding to the criterial EV value (a decrease in sensitivity) to the minimum sensitivity, and acquires a shutter speed and an aperture value corresponding to the minimum sensitivity with reference to, for example, a program diagram. The shutter speed and the aperture value are set as uniform set values for each of the image pickup apparatuses 20. However, in this case, there is a risk that exposure becomes insufficient in shooting with each of the image pickup apparatuses 20 other than the image pickup apparatus 20A. Thus, for example, on the basis of the EV value transmitted from the image pickup apparatus 20B and the uniform shutter speed and aperture value, the control unit 11 determines the set value of the sensitivity for the image pickup apparatus 20B. Similarly, the control unit 11 determines the set value of the sensitivity for each of the image pickup apparatuses 20C and 20D. After the performance of the above processing, the processing proceeds to step ST19.

At step ST19, the control unit 11 of the multiple-camera control apparatus 10 generates communication data (the setting information) including the ID of an image pickup apparatus 20, the set values (the set values relating to the shutter speed, the aperture, and the sensitivity), and the timing information associated together. The control unit 11 supplies the communication data that has been generated, to the communication unit 12. The communication unit 12 distributes the communication data to the image pickup apparatus 20. As described above, the corresponding image pickup apparatus 20 receives the communication data that has been distributed, at step ST15. Then, the processing proceeds to step ST20.

At step ST20, the control unit 25 of each image pickup apparatus 20 determines whether the current time is identical to the time indicated with the timing information. Here, in a case where the current time is not identical to the time indicated with the timing information, the processing goes back to step ST20 and then the processing at step ST20 is repeated. In a case where the current time is identical to the time indicated with the timing information, the processing proceeds to step ST21.

At step ST21, the control unit 25 of the image pickup apparatus 20A controls shooting to be performed, on the basis of the set values received at step ST15. The image pickup apparatuses 20B to 20D each control shooting to be performed, on the basis of the set values that have been received. With this arrangement, the synchronous shooting is performed with the four image pickup apparatuses 20.

Note that, as not illustrated, the images shot by the image pickup apparatuses 20 are transmitted to the multiple-camera control apparatus 10. The multiple-camera control apparatus 10 stitches the images transmitted from the image pickup apparatuses 20, together, to generate the VR image or the panoramic image. For example, a method referred to as a blending or a publicly known method can be applied to a method of stitching a plurality of images together.

According to the one embodiment described above, the set values relating to the shutter speed and the aperture are uniform between the image pickup apparatuses in generating the VR image or the panoramic image on the basis of the images acquired by the multiple-camera system with the plurality of image pickup apparatuses, so that a high-quality VR image or panoramic image can be generated. In addition, shooting can be performed with simultaneous reflection of switching in the set values, and thus a high-quality image having no difference in the set values relating to the exposure, can be generated for a moving image or a still image.

2. Modification

The one embodiment of the present disclosure has been specifically described above, but the contents of the disclosure are not limited to the one embodiment described above, and thus various modifications based on the technical idea of the present disclosure can be made.

(Modification for Modulating Sensitivity)

In a case where a plurality of images is stitched together in order to generate a VR image or a panoramic image, stitched portions are desirably made natural. Thus, the image pickup apparatuses 20 each may modulate the set value of the sensitivity set to itself, to shoot.

Figure 5A:
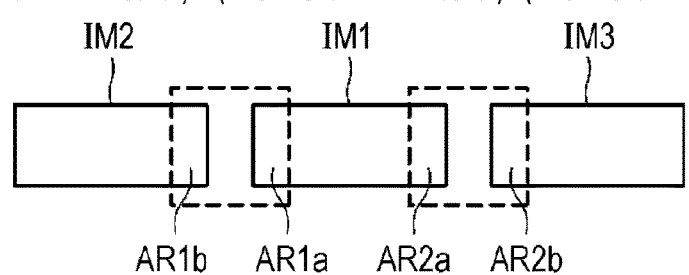
FIG. 5 illustrates a diagram and graphical representations for describing a modification.

The point will be described in detail with reference to FIG. 5. FIG. 5A schematically illustrates three images IM1 to IM3. For example, the image IM1 is shot by the image pickup apparatus 20B, and the image IM2 and the image IM3 shot by the image pickup apparatuses 20A and 20C adjacent to the image pickup apparatus 20B, respectively, are stitched together with the image IM1. Portions surrounded with dotted lines in FIG. 5A, indicate the portions at which the images IM1 to IM3 are stitched together. That is, a stitched portion AR1a in the image IM1 and a stitched portion AR1b in the image IM2 are stitched together. In addition, a stitched portion AR2a in the image IM1 and a stitched portion AR2b in the image IM3 are stitched together. For example, the corresponding stitched portions each include the same subject captured, and are stitched together on the basis of predetermined transmittance. Note that, the stitched portions AR1a, AR1b, AR2a, and AR2b may be set by the user, or may be automatically recognized by the control unit 25 of an image pickup apparatus 20 with the images IM1 to IM3.

Figure 5B:
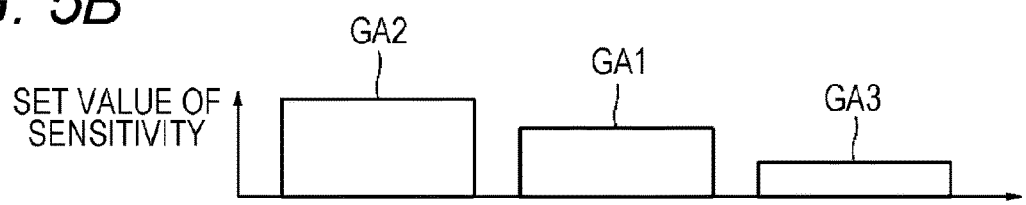

FIG. 5B schematically illustrates set values of the sensitivity GA1 to GA3 instructed by the multiple-camera control apparatus 10. The set value GA1 is the set value of the sensitivity set for the image pickup apparatus 20B. The set value GA2 is the set value of the sensitivity set for the image pickup apparatus 20A. The set value GA3 is the set value of the sensitivity set for the image pickup apparatus 20C. As described in the one embodiment, the set value of the sensitivity for each of the image pickup apparatuses 20, is set on the basis of the adequate total exposure amount. However, there is an environment in which the adequate total exposure amount varies for each of the image pickup apparatuses 20, depending on a shooting direction. In this case, there is a possibility that overexposure or underexposure occurs. Furthermore, there is a risk that a panoramic image or a VR image to be finally acquired, becomes unnatural due to an exposure difference occurring between the stitched portions AR1a and AR1b or between the stitched portions AR2a and AR2b. Thus, according to the modification, for example, processing of modulating the sensitivity in a frame is performed.

Exemplary specific details of the processing will be given below. The multiple-camera control apparatus 10 transmits the set values relating to the shutter speed, the aperture, and the sensitivity of the image pickup apparatus 20B (a main set value), and the timing information, to the image pickup apparatus 20B, similarly to the one embodiment. Furthermore, the multiple-camera control apparatus 10 transmits the set value of the sensitivity for each of the image pickup apparatuses 20 that shoot the images to be stitched with the image IM1 (according to the present modification, the image pickup apparatuses 20A and 20C) (a sub-set value).

Figure 5C:
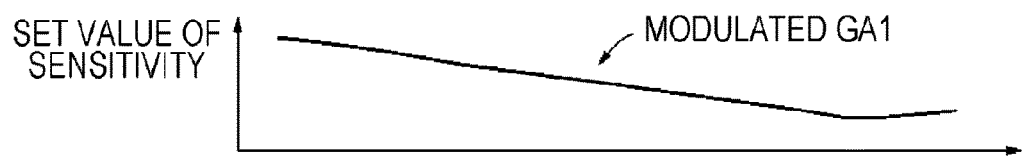

The control unit 25 of the image pickup apparatus 20B modulates the set value of the sensitivity GA1 for itself, with the set values GA2 and GA3. For example, as illustrated in FIG. 5C, the set value GA1 is modulated such that the set values GA1 to GA3 substantially linearly vary. A shot image is acquired with the set value of the sensitivity after the modulation. For example, the sensitivity that has been modulated in units of reading lines, in units of pixels, or in units of blocks each including a plurality of pixels, of the image pickup element is applied, in other words, the sensitivity to be applied varies. With this arrangement, the set value of the sensitivity to be applied to each of the stitched portions becomes substantially equivalent. The performance of the processing can prevent the overexposure or the underexposure from occurring, even in the environment in which the adequate exposure amount varies depending on the orientations of the image pickup apparatuses 20. Furthermore, the set value of the sensitivity becomes substantially equivalent between the stitched portions AR1a and AR1b. In addition, the set value of the sensitivity becomes substantially equivalent between the stitched portions AR2a and AR2b. Therefore, an excessive exposure difference can be prevented from occurring at the respective stitched portions of the images, so that a high-quality panoramic image or VR image can be acquired.

Note that, in a case where an image pickup apparatus 20 is arranged at an end as the image pickup apparatus 20A, for example, the set value of the sensitivity for the image pickup apparatus 20A is modulated in response to the set value of the sensitivity for the adjacent image pickup apparatus 20B. In addition, the present modification can be applied even in a case where images acquired upward and downward are stitched together. Furthermore, the method of modulating the sensitivity is not limited to changing the sensitivity linearly, and thus modulation may be performed with non-linear interpolation.

Note that, the user may make a setting to the multiple-camera control apparatus 10 for the arranged positions of the image pickup apparatuses 20, or the multiple-camera control apparatus 10 may recognize the arranged position of each image pickup apparatus 20 with reference to, for example, radio wave intensity or global positioning system (GPS). With this arrangement, for example, the multiple-camera control apparatus 10 can recognize that the set value of the sensitivity for each of the image pickup apparatuses 20A and 20C is at least transmitted to the image pickup apparatus 20B.

(Different Modification)

A different modification will be described. According to the one embodiment described above, the multiple-camera control apparatus 10 operates as the master, but the multiple-camera control apparatus 10 is not necessarily provided in the image pickup system 1. Furthermore, one of the four image pickup apparatuses 20 may operate as the master, similarly to the multiple-camera control apparatus 10. Note that, for example, in a case where the image pickup apparatus 20A operates as the master, the total-exposure-amount computing unit 24 that computes the total exposure amount of itself and the communication unit 26 that acquires the total exposure amount of each of the image pickup apparatuses 20B to 20D, function as an acquisition unit. For example, the user makes a setting in order to select one of the plurality of image pickup apparatuses 20 as the master.

The set values relating to the shutter speed and the aperture, uniform for each of the image pickup apparatuses 20, have favorably the same values, but an error may be allowed in a predetermined range in response to a difference in performance between the image pickup apparatuses 20 or the like. In addition, either of the set values of the shutter speed and the aperture (e.g., the set value of the aperture) may be uniform for each of the image pickup apparatuses 20, in the one embodiment described above.

According to the one embodiment described above, the largest EV value is determined as the criterial EV value, but the one embodiment is not limited to this. Note that, the determination of the largest EV value as the criterial EV value causes the set value of the sensitivity to be small, so that an effect against noise can be provided.

The control unit 11 of the multiple-camera control apparatus 10 may periodically calculate the set values for each image pickup apparatus 20 to make determination. With this arrangement, shooting based on appropriate set values can be performed even under an environment in which the adequate EV value varies, for example, due to a change in weather conditions. In addition, in a case where the image pickup apparatuses 20 periodically transmit the EV values to the multiple-camera control apparatus 10 and the EV value transmitted from any of the image pickup apparatuses 20 varies by a threshold value or more, the control unit 11 of the multiple-camera control apparatus 10 may recalculate the set values for each of the image pickup apparatuses 20.

Depending on a mode set to each of the image pickup apparatuses 20, the set value corresponding to the mode, may be prioritized. For example, in a case where a shutter speed priority mode or an aperture priority mode has been set to each of the image pickup apparatuses 20, the set value corresponding to the mode that has been set, may be preferentially applied.

Figure 4:
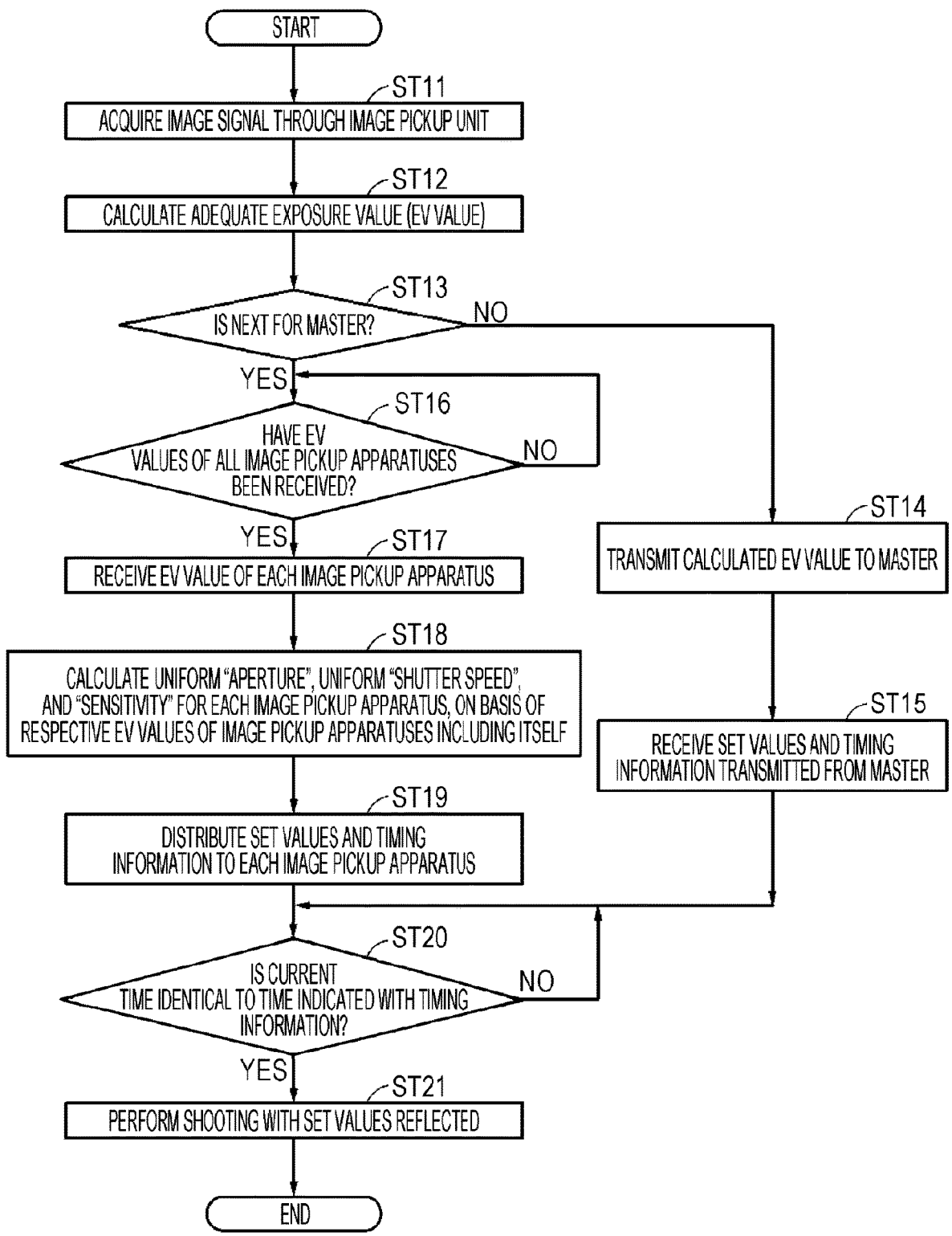
FIG. 4 is a flowchart of a flow of processing performed in the image pickup system according to the one embodiment.

The processing of FIG. 4 according to the one embodiment described above, may be repeated. Furthermore, after stitching of a plurality of images that has been acquired, together, the plurality of images may be reproduced from a predetermined image as the origin in a dynamic aspect, in response to, for example, an instruction for reproduction and a reproduced portion from the user.

The set values relating to the shooting, may be stored as metadata together with a finally acquired panoramic image or VR image.

The image pickup apparatuses according to the embodiment described above, each may be built in a medical device, such as a microscope, a smartphone, a computer apparatus, a game device, a robot, a security camera, or a moving object (e.g., a vehicle, a train, an airplane, a helicopter, a small flight vehicle, a construction vehicle, or an agricultural vehicle).

The present disclosure can be achieved in an arbitrary mode, such as an image pickup system including a plurality of apparatuses, a method, or a program, in addition to the apparatuses. For example, a program for performing the control described in the one embodiment is allowed to be downloaded and an image pickup apparatus having no control function described in the one embodiment (e.g., an image pickup apparatus included in a smartphone) downloads and installs the program, so that the image pickup apparatus can perform the control described in the one embodiment.

The present disclosure can also adopt the following configurations.

(1) A multi-camera control apparatus includes circuitry configured to receive respective camera settings from at least a first image pickup apparatus and a second image pickup apparatus;

identify an adjusted camera setting for the first image pickup apparatus to achieve a uniform brightness in a stitched portion of a composite image, the composite image including at least a portion of an image captured by the first image pickup apparatus and at least a portion of an image captured by the second image pickup apparatus; and send the adjusted camera setting to the first image pickup apparatus so the first image pickup apparatus will apply the adjusted camera setting when performing an image capture operation.

(2) The multi-camera control apparatus of (1), wherein the circuity is configured to receive at least one of a shutter speed setting, and an aperture setting for each of the first image pickup apparatus and the second image pickup apparatus.

(3) The multi-camera control apparatus of (2), wherein the circuitry is configured to identify the adjusted camera setting as at least one of an adjusted shutter speed setting, and an adjusted aperture setting.

(4) The multi-camera control apparatus of (2), wherein the circuitry is configured to receive a first exposure value from the first image pickup apparatus, and a second exposure value from the second image pickup apparatus, and with respect to the second image pickup apparatus, determine the adjusted camera setting as a different camera setting than a received camera setting which results in at least one of a uniform aperture, and a uniform shutter speed.

(5) The multi-camera control apparatus of (1), wherein the circuitry is configured to send timing information to inform the first image pickup apparatus and the second image pickup apparatus when to capture respective images that form the composite image.

(6) The multi-camera control apparatus of (1) wherein the circuitry is further configured to receive another camera setting from a third image pickup apparatus that captures another image that is combined in a second stitched portion of the composite image, the second stitched portion including at least a portion the image from the second image pickup apparatus and the another image from the third image pickup apparatus.

(7) The multi-camera control apparatus of (1), wherein the circuity is contained in a body of one of the first image pickup apparatus and the second image pickup apparatus.

(8) The multi-camera control apparatus of (1), wherein the circuitry is included in a vehicle drive controller.

(9) The multi-camera control apparatus of (1), wherein the circuitry is contained in one of a medical device, a game device, a robot, and a security camera.

(10) The multi-camera control apparatus of (1), wherein the composite image being one of a panoramic image and a virtual reality image.

(11) The multi-camera control apparatus of (1), wherein the circuitry is further configured to calculate a sensitivity set value for the first image pickup apparatus and send the set value to the first image pickup apparatus.

(12) A multi-camera control method including:

receiving respective camera settings from at least a first image pickup apparatus and a second image pickup apparatus;

identifying with circuitry an adjusted camera setting for the first image pickup apparatus to achieve a uniform brightness in a stitched portion of a composite image, the composite image including at least a portion of an image captured by the first image pickup apparatus and at least a portion of an image captured by the second image pickup apparatus; and sending the adjusted camera setting to the first image pickup apparatus so the first image pickup apparatus applies the adjusted camera setting when performing an image capture operation.

(13) The method of (12), wherein the receiving includes receiving at least one of a shutter speed setting, and an aperture setting for each of the first image pickup apparatus and the second image pickup apparatus.

(14) The method of (13), wherein the identifying includes identifying the adjusted camera setting as at least one of an adjusted shutter speed setting, and an adjusted aperture setting.

(15) The method of (13), wherein
the receiving includes receiving a first exposure value from the first image pickup apparatus, and a second exposure value from the second image pickup apparatus, and
with respect to the second image pickup apparatus, determining the adjusted camera setting as a different camera setting than a received camera setting which results in at least one of a uniform aperture, and a uniform shutter speed.

(16) The method of (12), further including:
sending timing information to inform the first image pickup apparatus and the second image apparatus when to capture respective images that form the composite image.

(17) The method of (12), further including:
receiving another camera setting from a third image pickup apparatus that captures another image that is combined in a second stitched portion of the composite image, wherein
the second stitched portion including at least a portion the image from the second image pickup apparatus and the another image from the third image pickup apparatus.

(18) The method of (12), further including:
controlling of vehicle driving operation using the composite image.

(19) The method of (12), further comprising:
calculating a sensitivity set value for the first image pickup apparatus and sending the set value to the first image pickup apparatus.

(20) A multi-camera control system including:
a first image pickup apparatus;
a second image pickup apparatus; and
a controller having circuitry configured to
receive respective camera settings from at least the first image pickup apparatus and the second image pickup apparatus,
identify an adjusted camera setting for the first image pickup apparatus to achieve a uniform brightness in a stitched portion of a composite image, the composite image including at least a portion of an image captured by the first image pickup apparatus and at least a portion of an image captured by the second image pickup apparatus, and
send the adjusted camera setting to the first image pickup apparatus, wherein the first image pickup apparatus applies the adjusted camera setting when performing an image capture operation.

(21) A control apparatus including:
an acquisition unit configured to acquire a plurality of total exposure amounts; and
a control unit configured to determine a criterial total exposure amount as a criterion from the plurality of total exposure amounts, and to determine a set value for each of a plurality of image pickup apparatuses, on the basis of the criterial total exposure amount.

(22) The control apparatus described in (21), in which the control unit determines a first set value uniform between the plurality of image pickup apparatuses and a second set value varying for each of the plurality of image pickup apparatuses.

(23) The control apparatus described in (22), further including:
a communication unit configured to transmit the first set value to all the plurality of image pickup apparatuses, and to transmit the second set value to the corresponding image pickup apparatus.

(24) The control apparatus described in (23), in which the communication unit transmits the second set value corresponding to a first image pickup apparatus and the second set value corresponding to a second image pickup apparatus different from the first image pickup apparatus, to the first image pickup apparatus.

(25) The control apparatus described in (24), in which the second image pickup apparatus captures an image to be stitched with an image captured by the first image pickup apparatus.

(26) The control apparatus described in any of (23) to (25), in which the communication unit transmits timing information indicating a timing at which shooting is performed, to all the plurality of image pickup apparatuses.

(27) The control apparatus described in (24) or (25), in which a plurality of the second image pickup apparatuses is provided.

(28) The control apparatus described in any of (21) to (27), further including: an image pickup apparatus.

(29) The control apparatus described in any of (21) to (28), in which the control unit periodically determines the set value for each of the image pickup apparatuses.

(30) The control apparatus described in any of (22) to (29), in which the first set value includes at least one of a shutter speed value and an aperture value, and the second set value includes sensitivity.

(31) The control apparatus described in (30), in which the first set value includes the shutter speed value and the aperture value.

(32) The control apparatus described in any of (21) to (31), in which the total exposure amounts each are an appropriate exposure value for shooting.

(33) An image pickup apparatus including:
an image pickup unit;
an acquisition unit configured to acquire at least a main set value set to the image pickup apparatus and a sub-set value set to a different image pickup apparatus; and
a control unit configured to modulate the main set value, on the basis of the sub-set value,
in which the main set value and the sub-set value each are a set value relating to sensitivity, and
the different image pickup apparatus captures an image to be stitched with an image acquired through the image pickup unit.

(34) The image pickup apparatus described in (33), in which the control unit modulates the main set value to make the sensitivity substantially equivalent between stitched portions of the images.

(35) A control method including:
acquiring a plurality of total exposure amounts by an acquisition unit; and
determining a criterial total exposure amount as a criterion from the plurality of total exposure amounts and determining a set value for each of a plurality of image pickup apparatuses on the basis of the criterial total exposure amount, by a control unit.

(36) A program for causing a computer to execute a control method including:
acquiring a plurality of total exposure amounts by an acquisition unit; and
determining a criterial total exposure amount as a criterion from the plurality of total exposure amounts and determining a set value for each of a plurality of image pickup apparatuses on the basis of the criterial total exposure amount, by a control unit.

(37) An image pickup system including:
a control apparatus; and
a plurality of image pickup apparatuses,
in which the control apparatus includes an acquisition unit configured to acquire a plurality of total exposure amounts, a control unit configured to determine a criterial total exposure amount as a criterion from the plurality of total exposure amounts, and to determine a set value for each of the plurality of image pickup apparatuses on the basis of the criterial total exposure amount, and a communication unit configured to transmit a first set value uniform between the plurality of image pickup apparatuses and timing information indicating a timing at which shooting is performed, to all the plurality of image pickup apparatuses, and to transmit a second set value varying for each of the plurality of image pickup apparatuses, to the corresponding image pickup apparatus, and the image pickup apparatuses each include an image pickup control unit configured to perform the shooting at the timing indicated with the timing information, on the basis of the first set value and the second set value.

(38) The image pickup system described in (37), in which one of the plurality of image pickup apparatuses functions as the control apparatus.

3. Application

The technology according to the present disclosure can be applied to various products. For example, the technology according to the present disclosure may be achieved as an apparatus to be mounted on a moving object in any kind of an automobile, an electric vehicle, a hybrid electric vehicle, a motorcycle, a bicycle, a personal transporter, an airplane, a drone, a ship, a robot, a construction machine, and an agricultural machine (a tractor).

FIG. 6 is a block diagram of an exemplary schematic configuration of a vehicle control system 7000 being an exemplary moving object control system to which the technology according to the present disclosure is applied. The vehicle control system 7000 includes a plurality of electronic control units connected through a communication network 7010. In the example illustrated in FIG. 6, the vehicle control system 7000 includes a drive system control unit 7100, a body system control unit 7200, a battery control unit 7300, an out-vehicle information detection unit 7400, an in-vehicle information detection unit 7500, and an integrated control unit 7600. The communication network 7010 connecting the plurality of control units together, may be an on-board communication network compliant with an arbitrary standard, such as a controller area network (CAN), a local interconnect network (LIN), a local area network (LAN), or FlexRay (registered trademark).

Each control unit includes a microcomputer that performs computing processing in accordance with various programs, a storage unit that stores a program executed by the microcomputer, parameters used for various types of computing, or the like, and a drive circuit that drives various apparatuses to be controlled. Each control unit includes a network I/F for communicating with the other control units through the communication network 7010, and additionally includes a communication I/F for communicating with in-vehicle/out-vehicle apparatuses, sensors, or the like in wired communication or radio communication. FIG. 6 illustrates a microcomputer 7610, a general-purpose communication I/F 7620, a dedicated communication I/F 7630, a positioning unit 7640, a beacon reception unit 7650, an in-vehicle device I/F 7660, a voice and image output unit 7670, an on-board network I/F 7680, and a storage unit 7690 as the functional configuration of the integrated control unit 7600. Similarly, the other control units each include a microcomputer, a communication I/F, a storage unit, and the like.

The drive system control unit 7100 controls the operation of an apparatus relating to the drive system of the vehicle, in accordance with the various programs. For example, the drive system control unit 7100 functions as a control apparatus for a driving force generation apparatus that generates the driving force of the vehicle, such as an internal combustion engine or a drive motor, a driving force transmission mechanism for transmitting the driving force to the wheels, a steering mechanism for adjusting the rudder angle of the vehicle, and a braking apparatus that generates the breaking force of the vehicle. The drive system control unit 7100 may have a function as a control apparatus for an antilock brake system (ABS) or electronic stability control (ESC).

A vehicle state detector 7110 is connected to the drive system control unit 7100. For example, the vehicle state detector 7110 includes at least one of a gyroscope sensor that detects the angular velocity in body-axis rotary motion, an acceleration sensor that detects the acceleration of the vehicle, and a sensor that detects the manipulated variable of an accelerator pedal, the manipulated variable of a brake pedal, the steering angle of a steering wheel, engine speed, or wheel speed. The drive system control unit 7100 performs the computing processing with a signal input from the vehicle state detector 7110, to control, for example, the internal combustion engine, the drive motor, the electric power steering apparatus, or the brake apparatus.

The body system control unit 7200 controls the various apparatuses mounted on the body to operate, in accordance with the various programs. For example, the body system control unit 7200 functions as a control apparatus for a keyless entry system, a smart key system, a power window apparatus, or various lamps, such as head lamps, rear lamps, brake lamps, blinkers, and fog lamps. In this case, a radio wave transmitted from a portable device substituting for the key, or signals of various switches are input into the body system control unit 7200. The body system control unit 7200 receives the input of the radio wave or the signals, to control, for example, the door lock apparatus, power window apparatus, or lamps of the vehicle.

The battery control unit 7300 controls a secondary battery 7310 being a power source for the drive motor, in accordance with the various programs. For example, a battery apparatus including the secondary battery 7310, inputs information regarding the temperature of the battery, the output voltage of the battery, or the remaining capacity of the battery, into the battery control unit 7300. The battery control unit 7300 performs the computing processing with the signals, to control, for example, temperature adjustment control of the secondary battery 7310 or a cooling apparatus included in the battery apparatus.

The out-vehicle information detection unit 7400 detects external information regarding the vehicle including the vehicle control system 7000 mounted. For example, at least one of an image pickup unit 7410 and an out-vehicle information detector 7420 is connected to the out-vehicle information detection unit 7400. The image pickup unit 7410 includes at least one of time of flight (ToF) camera, a stereo camera, a monocular camera, an infrared camera, and a different camera. For example, the out-vehicle information detector 7420 includes at least one of an environment sensor that detects the current weather or meteorological phenomenon, and a peripheral information detection sensor that detects a different vehicle, an obstruction, or a pedestrian on the periphery of the vehicle including the vehicle control system 7000 mounted.

For example, the environment sensor may include at least one of a raindrop sensor that detects rainy weather, a fog sensor that detects fog, an insolation sensor that detects the degree of insolation, and a snow sensor that detects snowfall. The peripheral information detection sensor may include at least one of an ultrasonic sensor, a radar apparatus, and a light detection and ranging/laser imaging detection and ranging (LIDAR) apparatus. The image pickup unit 7410 and the out-vehicle information detector 7420 each may be provided as an independent sensor or apparatus, or may be provided as an apparatus including a plurality of sensors or apparatuses integrated.

Figure 7:
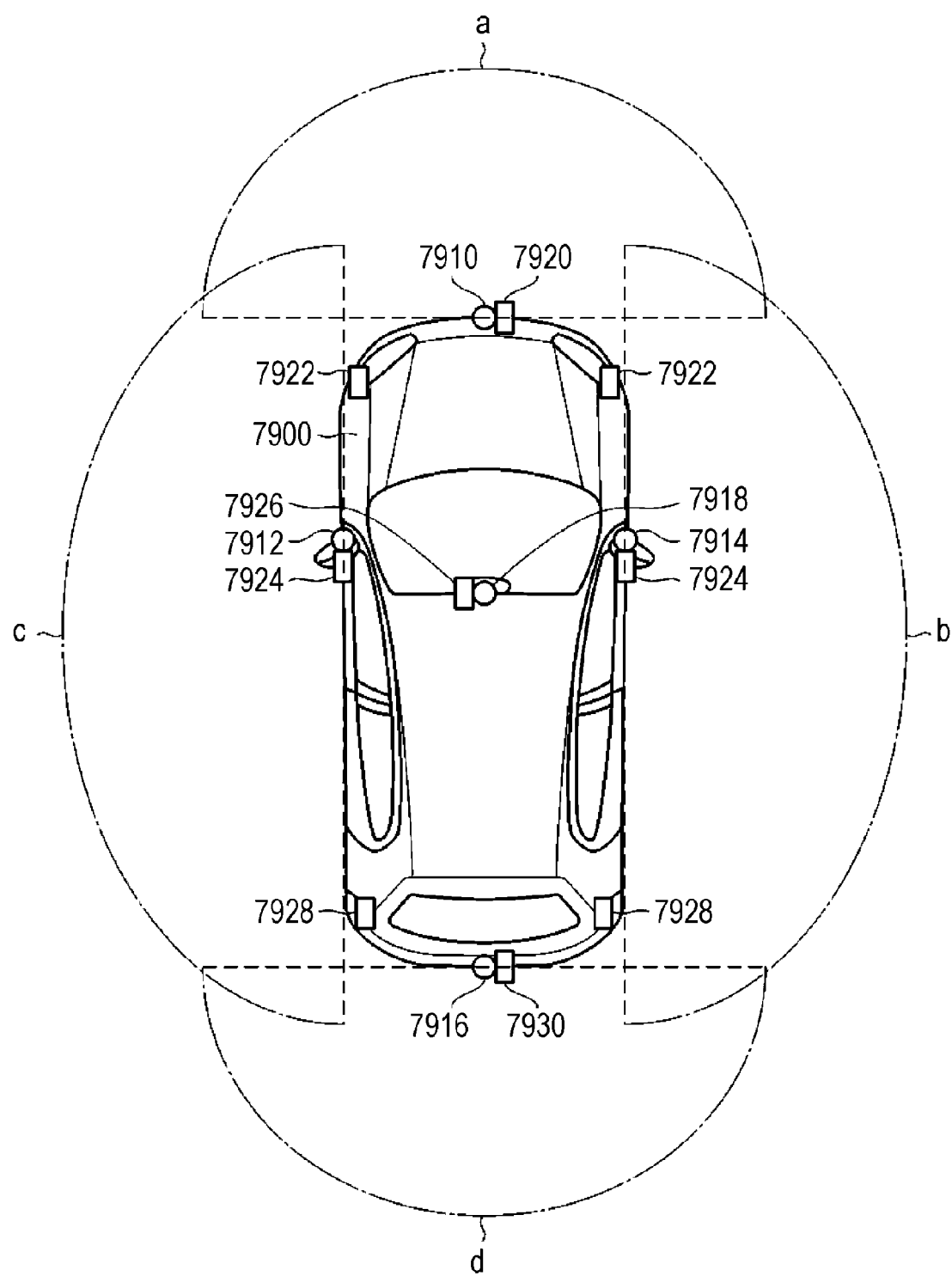
FIG. 7 is an explanatory diagram of the installed positions of out-vehicle information detectors and image pickup units.

Here, FIG. 7 illustrates exemplary installed positions of the image pickup unit 7410 and the out-vehicle information detector 7420. For example, image pickup units 7910, 7912, 7914, 7916, and 7918 each are provided to at least one of the front nose, side view minors, rear bumper, and back door of a vehicle 7900 and the upper portion of the windshield in the room. The image pickup unit 7910 provided at the front nose and the image pickup unit 7918 provided at the upper portion of the windshield in the room, each mainly acquire an image ahead of the vehicle 7900. The image pickup units 7912 and 7914 provided at the side view minors, each mainly acquire an image in the lateral direction of the vehicle 7900. The image pickup unit 7916 provided at the rear bumper or the back door, mainly acquires an image behind the vehicle 7900. The image pickup unit 7918 provided at the upper portion of the windshield in the room, is mainly used in order to detect, for example, a leading vehicle, a pedestrian, an obstruction, a signal, a traffic sign, or a traffic lane.

Note that, FIG. 7 illustrates exemplary respective shot ranges of the image pickup units 7910, 7912, 7914, and 7916. An image pickup range that indicates the image pickup range of the image pickup unit 7910 provided at the front nose. Image pickup ranges b and c indicate the image pickup ranges of the image pickup units 7912 and 7914 provided at the side view mirrors, respectively. An image pickup range d indicates the image pickup range of the image pickup unit 7916 provided at the rear bumper or the back door. For example, pieces of image data captured by the image pickup units 7910, 7912, 7914, and 7916 are overlapped each other, so that an aerial image including the vehicle 7900 viewed from above is acquired.

For example, out-vehicle information detectors 7920, 7922, 7924, 7926, 7928, and 7930 provided at the front, rear, sides, corners of the vehicle 7900 and the upper portion of the windshield in the room, each may include an ultrasonic sensor or a radar apparatus. For example, the out-vehicle information detectors 7920, 7926, and 7930 provided at the front nose, rear bumper or back door of the vehicle 7900, and the upper portion of the windshield in the room, each may include a LIDAR apparatus. The out-vehicle information detectors 7920 to 7930 each are mainly used in order to detect, for example, a leading vehicle, a pedestrian, or an obstruction.

Referring back to FIG. 6, the description will be continued. The out-vehicle information detection unit 7400 causes the image pickup unit 7410 to capture an out-vehicle image, and additionally receives the captured image data. In addition, the out-vehicle information detection unit 7400 receives detection information from the out-vehicle information detector 7420 connected thereto. In a case where the out-vehicle information detector 7420 includes an ultrasonic sensor, a radar apparatus, or a LIDAR apparatus, the out-vehicle information detection unit 7400 transmits, for example, an ultrasonic wave or an electromagnetic wave and additionally receives information regarding the reflected wave that has been received. The out-vehicle information detection unit 7400 may perform object detection processing or range detection processing to, for example, a person, a car, an obstruction, a sign, or characters on a road surface, on the basis of the information that has been received. The out-vehicle information detection unit 7400 may perform environment recognition processing of recognizing, for example, rainfall, fog, or road surface conditions, on the basis of the information that has been received. The out-vehicle information detection unit 7400 may calculate a distance to an out-vehicle object, on the basis of the information that has been received.

In addition, the out-vehicle information detection unit 7400 may perform image recognition processing of recognizing, for example, a person, a car, an obstruction, a sign, or characters on a road surface, or range detection processing, on the basis of the received image data. The out-vehicle information detection unit 7400 may perform, for example, distortion correction or positioning to the received image data and additionally may make a combination with image data captured by a different image pickup unit 7410 to generate an aerial image or a panoramic image. The out-vehicle information detection unit 7400 may perform viewpoint conversion processing with the image data captured by the different image pickup unit 7410.

The in-vehicle information detection unit 7500 detects in-vehicle information. For example, a driver state detector 7510 that detects the state of the driver, is connected to the in-vehicle information detection unit 7500. The driver state detector 7510 may include a camera that captures the driver, a biological sensor that detects biological information regarding the driver, a microphone that collects a voice in the room, or the like. The biological sensor is provided to, for example, the surface of a seat or the steering wheel, to detect biological information regarding an occupant sitting on the seat or the driver holding the steering wheel. The in-vehicle information detection unit 7500 may calculate the degree of fatigue or the degree of concentration of the driver, or may determine whether the driver is drowsy, on the basis of the detection information input from the driver state detector 7510. The in-vehicle information detection unit 7500 may perform processing, such as noise-canceling processing, to a collected voice signal.

The integrated control unit 7600 controls the entire operation in the vehicle control system 7000, in accordance with the various programs. An input unit 7800 is connected to the integrated control unit 7600. The input unit 7800 is achieved with an apparatus input-operated by the occupant through, for example, a touch panel, a button, a microphone, a switch, or a lever. Data acquired by voice recognition of a voice input through the microphone, may be input into the integrated control unit 7600. For example, the input unit 7800 may include a remote control apparatus with infrared rays or a different radio wave, or an external connection apparatus, such as a portable phone or a personal digital assistant (PDA), compliant with the operation of the vehicle control system 7000. For example, the input unit 7800 may include a camera, and the occupant can input information with a gesture in that case. Alternatively, data acquired by detection of the motion of a wearable apparatus worn on the occupant, may be input. Furthermore, for example, the input unit 7800 may include an input control circuit that generates an input signal on the basis of the information input by the occupant or the like with the input unit 7800 and outputs the input signal to the integrated control unit 7600. For example, the occupant operates the input unit 7800 to input various types of data or to issue an instruction for a processing operation, to the vehicle control system 7000.

The storage unit 7690 may include a read only memory (ROM) that stores the various programs executed by the microcomputer 7610 and a random access memory (RAM) stores various parameters, a computed result, a sensor value, or the like. In addition, the storage unit 7690 may be achieved with a magnetic storage device, such as a hard disk drive (HDD), a semiconductor storage device, an optical storage device, or a magneto-optical storage device.

The general-purpose communication I/F 7620 mediates communication with various devices present in an external environment 7750. The general-purpose communication I/F 7620 may be equipped with a cellular communications protocol, such as global system of mobile communications (GSM) (registered trademark), WiMAX (registered trademark), long term evolution (LTE) (registered trademark), or LTE advanced (LTE-A), or a different radio communications protocol, such as a wireless LAN (also referred to as Wi-Fi (registered trademark) or Bluetooth (registered trademark). For example, the general-purpose communication I/F 7620 may be connected to a device (e.g., an application server or a control server) present on an external network (e.g., the Internet, a cloud network, or a network unique to a business operator) through a base station or an access point. In addition, for example, the general-purpose communication I/F 7620 may be connected with a terminal present in proximity to the vehicle (e.g., a terminal of the driver, a terminal of a pedestrian, a terminal of a store, or a machine type communication (MTC) terminal) with a peer to peer (P2P) technology.

The dedicated communication I/F 7630 supports a communications protocol designed for use in the vehicle. The dedicated communication I/F 7630 may be equipped with a standard protocol, such as wireless access in vehicle environment (WAVE) including a combination of IEEE802.11p being a lower layer and IEE6609 being an upper layer, dedicated short range communications (DSRC), or a cellular communications protocol. The dedicated communication I/F 7630 typically performs V2X communications being a concept including at least one of vehicle to vehicle communications, vehicle to infrastructure communications, vehicle to home communications, and vehicle to pedestrian communications.

For example, the positioning unit 7640 performs positioning with reception of a global navigation satellite system (GNSS) signal from a GNSS satellite (e.g., a global positioning system (GPS) signal from a GPS satellite), to generate a positional information including the latitude, longitude, and altitude of the vehicle. Note that, the positioning unit 7640 may specify the current position with an exchange of signals with a wireless access point, or may acquire the positional information from a terminal, such as a portable phone, a PHS, or a smartphone, having a positioning function.

For example, the beacon reception unit 7650 receives a radio wave or an electromagnetic wave transmitted from a radio station installed on a road, to acquire information, such as the current position, traffic jams, closed roads, or the time necessary. Note that, the function of the beacon reception unit 7650 may be included in the dedicated communication I/F 7630 described above.

The in-vehicle device I/F 7660 is a communication interface mediating connection between the microcomputer 7610 and various in-vehicle devices 7760 present in the vehicle. The in-vehicle device I/F 7660 may establish radio connection with a radio communications protocol, such as a wireless LAN, Bluetooth (registered trademark), near field communication (NFC), or wireless USB (WUSB). In addition, the in-vehicle device I/F 7660 may establish wired connection, such as universal serial bus (USB), high-definition multimedia interface (HDMI) (registered trademark), or mobile high-definition link (MHL), through a connecting terminal not illustrated (and a cable if necessary). For example, the in-vehicle devices 7760 may include at least one of a mobile device or a wearable device possessed by the occupant and information device carried in or mounted on the vehicle. In addition, the in-vehicle devices 7760 may include a navigation apparatus that performs a search of routes to an arbitrary destination. The in-vehicle device I/F 7660 exchanges control signals or data signals with the in-vehicle devices 7760.

The on-board network I/F 7680 is an interface mediating communication between the microcomputer 7610 and the communication network 7010. The on-board network I/F 7680 transmits and receives, for example, signals in accordance with a predetermined protocol supported by the communication network 7010.

The microcomputer 7610 of the integrated control unit 7600 controls the vehicle control system 7000 in accordance with the various programs, on the basis of information acquired through at least one of the general-purpose communication I/F 7620, the dedicated communication I/F 7630, the positioning unit 7640, the beacon reception unit 7650, the in-vehicle device I/F 7660, and the on-board network I/F 7680. For example, the microcomputer 7610 may compute a control target value for the driving force generation apparatus, the steering mechanism, or the braking apparatus to output a control command to the drive system control unit 7100, on the basis of in-vehicle/out-vehicle information to be acquired. For example, the micro-computer 7610 may perform cooperative control for achieving the function of an advanced driver assistance system (ADAS) including collision avoidance or impact alleviation of the vehicle, follow-up traveling based on the following distance, speed-kept traveling, collision warning of the vehicle, and lane-departure warning of the vehicle. In addition, the microcomputer 7610 may control the driving force generation apparatus, the steering mechanism, the braking apparatus, or the like on the basis of vehicle peripheral information to be acquired, to perform cooperative control for automated driving or the like of autonomously traveling without the operation of the driver.

The microcomputer 7610 may generate three-dimensional range information between the vehicle and an object, such as a peripheral structure or person, to create local geographic information including peripheral information regarding the current position of the vehicle, on the basis of the information acquired through at least one of the general-purpose communication I/F 7620, the dedicated communication I/F 7630, the positioning unit 7640, the beacon reception unit 7650, the in-vehicle device I/F 7660, and the on-board network I/F 7680. In addition, the microcomputer 7610 may predict danger, such as a collision of the vehicle, the approach of a pedestrian and the like, or an access to a closed road, to generate a warning signal, on the basis of the information to be acquired. For example, the warning signal may include a signal for generating an alarm or lighting a warning lamp on.

The voice and image output unit 7670 transmits an output signal of at least one of a voice and an image to an output apparatus capable of notifying the occupant of the vehicle or the outside of the vehicle of information visually or aurally. The example of FIG. 6 exemplifies an audio speaker 7710, a display unit 7720, and an instrument panel 7730 as the output apparatus. For example, the display unit 7720 may include at least one of an on-board display and a head-up display. The display unit 7720 may have an augmented reality (AR) display function. The output apparatus may include a different apparatus, for example, a headphone, a wearable device, such as a spectacle-type display, to be worn on the occupant, a projector, or a lamp, other than the above apparatuses. In a case where the output apparatus includes a display apparatus, the display apparatus visually displays results acquired with the various types of processing performed by the microcomputer 7610 or information received from a different control unit, in various formats, such as text, images, tables, and graphs. In addition, in a case where the output apparatus includes a voice output apparatus, the voice output apparatus converts an audio signal including reproduced voice data, sound data, or the like, into an analog signal, to aurally output the analog signal.

Note that, at least two of the control units connected through the communication network 7010, may be integrally formed as one control unit in the example illustrated in FIG. 6 Alternatively, the individual control units each may include a plurality of control units. Furthermore, the vehicle control system 7000 may include a different control unit not illustrated. In addition, the entirety or part of the function assumed by any of the control units, may be assumed by a different control unit in the descriptions above. That is, if the information is allowed to be transmitted and received through the communication network 7010, predetermined computing processing may be performed by any of the control units. Similarly, a sensor or an apparatus connected to any of the control units, may be connected to a different control unit and additionally the plurality of control units mutually transmits and receives the detection information through the communication network 7010.

Note that, a computer program for achieving the respective functions of the multiple-camera control apparatus 10 and the image pickup apparatuses 20 according to the present embodiment described with FIGS. 2, 3, and the like, can be implemented in any of the control units and the like. In addition, a computer-readable recording medium storing the computer program, can be provided. Examples of the recording medium include a magnetic disk, an optical disc, a magneto-optical disc, and a flash memory. In addition, for example, the computer program may be distributed through a network without the recording medium.

An image pickup apparatus 20 according to the present embodiment described with FIGS. 2, 3, and the like, can be applied to, for example, the image pickup unit 7410 in the vehicle control system 7000 described above.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Image pickup system
10 Multiple-camera control apparatus
11 Control unit
12 Communication unit
20, 20A, 20B, 20C, 20D Image pickup apparatus
22 Image pickup unit
23 Signal processing unit
24 Total-exposure-amount computing unit
25 Control unit
26 Communication unit

The invention claimed is:

1. A control apparatus comprising:
   circuitry configured to
      receive respective camera settings of camera imaging parameters from at least a first imaging apparatus and a second imaging apparatus;
      identify an adjusted camera setting of at least one camera imaging parameter for the first imaging apparatus based on sensitivity in a stitched portion of a composite image, the composite image including at least a portion of an image captured by the first imaging apparatus and at least a portion of an image captured by the second imaging apparatus; and
      send the adjusted camera setting to the first imaging apparatus, the first imaging apparatus using the adjusted camera setting to set the at least one camera imaging parameter in order to capture images,
   wherein the first imaging apparatus modifies the adjusted camera setting based on internal parameters thereof.

2. The control apparatus of claim 1, wherein the circuitry is configured to receive at least one of a shutter speed setting, and an aperture setting for each of the first imaging apparatus and the second imaging apparatus.

3. The control apparatus of claim 2, wherein the circuitry is configured to identify the adjusted camera setting as at least one of an adjusted shutter speed setting, and an adjusted aperture setting.

4. The control apparatus of claim 2, wherein the circuitry is configured to
   receive a first exposure value from the first imaging apparatus, and a second exposure value from the second imaging apparatus, and
   with respect to the second imaging apparatus, determine the adjusted camera setting as a different camera setting than a received camera setting which results in at least one of a uniform aperture, and a uniform shutter speed.

5. The control apparatus of claim 1, wherein the circuitry is configured to send timing information to inform the first imaging apparatus and the second imaging apparatus when to capture respective images that form the composite image.

6. The control apparatus of claim 1 wherein the circuitry is further configured to receive another camera setting from a third imaging apparatus that captures another image that is combined in a second stitched portion of the composite image,
   the second stitched portion including at least a portion the image from the second imaging apparatus and the another image from the third imaging apparatus.

7. The control apparatus of claim 1, wherein the circuitry is contained in a body of one of the first imaging apparatus and the second imaging apparatus.

8. The control apparatus of claim 1, wherein the circuitry is included in a vehicle drive controller.

9. The control apparatus of claim 1, wherein the circuitry is contained in one of a medical device, a game device, a robot, and a security camera.

10. The control apparatus of claim 1, wherein the composite image being one of a panoramic image and a virtual reality image.

11. The control apparatus of claim 1, wherein the circuitry is further configured to calculate a sensitivity set value for the first imaging apparatus and send the set value to the first imaging apparatus.

12. A control method comprising:
receiving respective camera settings of camera imaging parameters from at least a first imaging apparatus and a second imaging apparatus;
identifying with circuitry an adjusted camera setting of at least one camera imagine parameter for the first imaging apparatus based on sensitivity in a stitched portion of a composite image, the composite image including at least a portion of an image captured by the first imaging apparatus and at least a portion of an image captured by the second imaging apparatus; and
sending the adjusted camera setting to the first imaging apparatus so the first imaging apparatus uses the adjusted camera setting to set the at least one camera imaging parameter in order to capture images,
wherein the first imaging apparatus modifies the adjusted camera setting based on internal parameters thereof.

13. The method of claim 12, wherein the receiving includes receiving at least one of a shutter speed setting, and an aperture setting for each of the first imaging apparatus and the second imaging apparatus.

14. The method of claim 13, wherein the identifying includes identifying the adjusted camera setting as at least one of an adjusted shutter speed setting, and an adjusted aperture setting.

15. The method of claim 13, wherein
the receiving includes receiving a first exposure value from the first imaging apparatus, and a second exposure value from the second imaging apparatus, and
with respect to the imaging pickup apparatus, determining the adjusted camera setting as a different camera setting than a received camera setting which results in at least one of a uniform aperture, and a uniform shutter speed.

16. The method of claim 12, further comprising:
sending timing information to inform the first imaging apparatus and the second imaging when to capture respective images that form the composite image.

17. The method of claim 12, further comprising:
receiving another camera setting from a third imaging apparatus that captures another image that is combined in a second stitched portion of the composite image, wherein
the second stitched portion including at least a portion the image from the second imaging apparatus and the another image from the third imaging apparatus.

18. The method of claim 12, further comprising:
controlling of vehicle driving operation using the composite image.

19. The method of claim 12, further comprising:
calculating a sensitivity set value for the first imaging apparatus and sending the set value to the first imaging apparatus.

20. A control system comprising:
a first imaging apparatus;
a second imaging apparatus; and
a controller having circuitry configured to
receive respective camera settings of camera imaging parameters from at least the first imaging apparatus and the second imaging apparatus,
identify an adjusted camera setting of at least one camera imaging parameter for the first imaging apparatus based on sensitivity in a stitched portion of a composite image, the composite image including at least a portion of an image captured by the first imaging apparatus and at least a portion of an image captured by the second imaging apparatus, and
send the adjusted camera setting to the first imaging apparatus,
wherein the first imaging apparatus uses the adjusted camera setting to set the at least one camera imaging parameter in order to capture images, wherein the first imaging apparatus modifies the adjusted camera setting based on internal parameters thereof.

* * * * *